United States Patent
Sarkar

(10) Patent No.: US 10,503,159 B2
(45) Date of Patent: Dec. 10, 2019

(54) DYNAMIC MODEL-BASED RINGER PROFILES

(71) Applicant: Plantronics, Inc., Santa Cruz, CA (US)

(72) Inventor: Shantanu Sarkar, San Jose, CA (US)

(73) Assignee: Plantronics, Inc., Santa Cruz, CA (US)

(*) Notice: Subject to any disclaimer, the term of this patent is extended or adjusted under 35 U.S.C. 154(b) by 150 days.

(21) Appl. No.: 15/710,595

(22) Filed: Sep. 20, 2017

(65) Prior Publication Data

US 2019/0086910 A1 Mar. 21, 2019

(51) Int. Cl.
G05B 23/02 (2006.01)
G08B 3/10 (2006.01)
G06F 16/435 (2019.01)
H04M 1/247 (2006.01)
H04M 19/04 (2006.01)
G06F 16/48 (2019.01)
H04M 1/64 (2006.01)

(52) U.S. Cl.
CPC ....... *G05B 23/0243* (2013.01); *G06F 16/435* (2019.01); *G06F 16/48* (2019.01); *G08B 3/1041* (2013.01); *H04M 1/247* (2013.01); *H04M 19/041* (2013.01); *H04M 1/64* (2013.01)

(58) Field of Classification Search
CPC . G05B 23/0243; G08B 3/1041; G06F 16/435; G06F 16/48
USPC ...... 379/67.1–88.28, 110.01, 142.01–142.18, 379/156–200, 251–257, 350–353, 379/372–376.02
See application file for complete search history.

(56) References Cited

U.S. PATENT DOCUMENTS

| | | | |
|---|---|---|---|
| 5,479,476 A | 12/1995 | Finke-Anlauff | |
| 6,084,959 A * | 7/2000 | Yun | H04M 19/04 340/328 |
| 6,347,133 B1 * | 2/2002 | Galbreath | H04M 1/642 379/67.1 |
| 6,763,105 B1 * | 7/2004 | Miura | H04M 1/642 379/372 |
| 7,024,229 B2 * | 4/2006 | Nishimura | H04M 19/044 19/44 |
| 7,353,047 B2 * | 4/2008 | Boyd | H04M 1/72566 379/164 |
| 7,496,352 B2 * | 2/2009 | Kaminsky | H04M 1/72572 455/412.1 |
| 8,848,930 B2 * | 9/2014 | Lundin | H04M 19/044 19/44 |
| 2001/0014616 A1 * | 8/2001 | Matsuda | H04M 19/04 455/567 |
| 2003/0013495 A1 * | 1/2003 | Oleksy | H04M 19/04 455/567 |

(Continued)

*Primary Examiner* — Hemant S Patel
(74) *Attorney, Agent, or Firm* — Jeremy S. DesRosier

(57) ABSTRACT

The invention relates to a method for dynamic model-based ringer profiles. The method includes receiving one or more incoming calls, and, based on the one or more incoming calls, generating one or more incoming call records. Each of the incoming call records includes an elapsed ringing time value associated with one of the incoming calls. Also, the method includes storing one or more ringer profiles. The ringer profiles are generated using the one or more incoming call records. The ringer profiles include a current ringer profile. Further, the method includes receiving a new incoming call, and, in response to receiving the new incoming call, sounding a ringtone according to the current ringer profile.

18 Claims, 6 Drawing Sheets

(56) References Cited

U.S. PATENT DOCUMENTS

| | | | | |
|---|---|---|---|---|
| 2003/0224772 | A1* | 12/2003 | Patzer | H04M 3/2263 455/419 |
| 2004/0032946 | A1* | 2/2004 | Koser | H04M 3/02 379/373.01 |
| 2004/0203656 | A1* | 10/2004 | Andrew | H04M 1/72563 455/414.1 |
| 2005/0064913 | A1* | 3/2005 | Kim | H04M 19/041 455/567 |
| 2006/0105800 | A1* | 5/2006 | Lee | H04M 1/6505 455/550.1 |
| 2006/0116116 | A1* | 6/2006 | Slemmer | H04M 3/06 455/418 |
| 2008/0075271 | A1* | 3/2008 | Bostick | H04M 19/04 379/418 |
| 2011/0003587 | A1* | 1/2011 | Belz | H04M 19/04 455/419 |
| 2014/0187212 | A1* | 7/2014 | Dong | H04M 1/575 455/414.1 |

* cited by examiner

DYNAMIC MODEL-BASED RINGER PROFILES

FIELD

The present disclosure relates generally to the field of enterprise telephony devices. More particularly, the present disclosure relates to ringer control of office telephones.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

As companies embrace open office environments, employees find themselves working in closer proximity to each other. Moreover, due to intraoffice collaboration, individual employees may find themselves at their desks with surprising infrequency. Telephone ringtones are the most common method of alerting a user to an incoming call at his or her phone, especially for desk-based phones that are not worn on the person or otherwise kept in intermittent or constant physical contact with the user such as in the case of cellular phones. In environments where users work in close proximity to each other, a desk phone's ringer can annoy neighboring users, especially when the ringer of the phone has been set to an elevated volume, and/or the user whose phone is ringing is currently or frequently not at his or her desk.

SUMMARY

In general, in one aspect, the invention relates to a method for dynamic model-based ringer profiles. The method includes receiving one or more incoming calls, and, based on the one or more incoming calls, generating one or more incoming call records. Each of the incoming call records includes an elapsed ringing time value associated with one of the incoming calls. Also, the method includes storing one or more ringer profiles. The ringer profiles are generated using the one or more incoming call records. The ringer profiles include a current ringer profile. Further, the method includes receiving a new incoming call, and, in response to receiving the new incoming call, sounding a ringtone according to the current ringer profile.

In general, in one aspect, the invention relates to a desk phone utilizing dynamic model-based ringer profiles. The desk phone includes a communications interface, a ringer, a timer, at least one processor, and memory coupled to the at least one processor. The memory stores instructions which, when executed by the at least one processor, cause the at least one processor to perform a process. The process includes receiving one or more incoming calls. The process also includes, for each of the one or more incoming calls, calculating an elapsed ringing time value of the incoming call using the timer, and generating an incoming call record including the elapsed ringing time value of the incoming call. Further, the process includes sending the one or more incoming call records to a remote ringer profile server, and receiving, from the remote ringer profile server, a current ringer profile. Still yet, the process includes storing the current ringer profile, receiving a new incoming call, and, in response to receiving the new incoming call, sounding the ringer according to the current ringer profile.

In general, in one aspect, the invention relates to a system for generating dynamic model-based ringer profiles. The system includes at least one processor and memory coupled to the at least one processor. The memory stores instructions which, when executed by the at least one processor, cause the at least one processor to perform a process. The process includes receiving, from a desk phone, one or more incoming call records. Each of the incoming call records includes an elapsed ringing time value. Also, the process includes storing the one or more incoming call records as historical data, and building a ringer model by applying a model builder to the historical data. Further, the process includes generating a ringer profile by applying the ringer model to current data, and transmitting the ringer profile to the desk phone.

The details of one or more implementations are set forth in the accompanying drawings and the description below. Other features will be apparent from the description and drawings, and from the claims.

DETAILED DESCRIPTION

Figure 1:
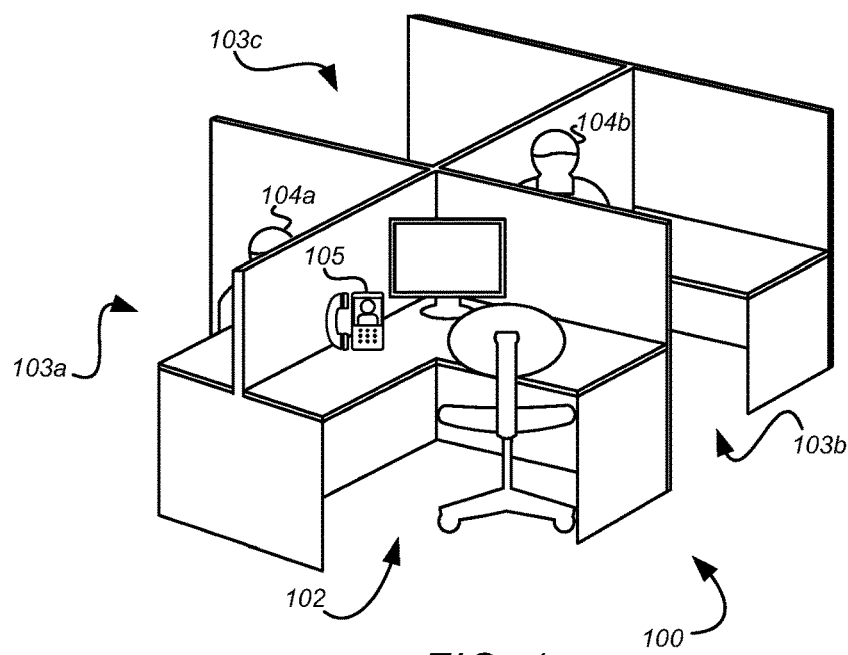
FIG. 1 shows an environment for dynamic model-based ringer profiles, in accordance with one or more embodiments.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

Telephone ringers are traditionally configured to play a ringtone for a fixed duration at a fixed volume (e.g., 15 seconds at 80% volume, etc.), typically according to a user-configured setting. A ringtone includes any sound output by a telephone to alert its user of an incoming call. A ringtone may include, for example, a pre-recorded audio file (e.g., way, mp3, aiff, etc.) that is played back by an electronic ringer in response to a signal or command received over a network (e.g., a detected voltage, a logical signal, an Application Program Interface (API) call, etc.). While frequency characteristics may vary between ringtones, different makes and models of phones may store different pre-recorded audio files for use as ringtones, and the ringtone volume may be user adjusted, the basic principle of telephone ringtones has remained the same—a ringing phone plays music or rings with a set of tones, usually with periodic intervals of silence, at a constant volume for a fixed amount of time until the incoming call times out or is answered. For users in the vicinity of a ringing phone, without the permission or authority to answer the phone or change its ringer settings, such a phone may be annoying, and may decrease productivity.

Prior solutions to this issue have enabled a user to configure his or her ringer settings, such as ringer volume, ringer tone, and ringer duration. However, effective management of these settings to avoid disrupting neighboring workers may require constant attention and adjustment by a phone's user, which can, in many circumstances, prove inadequate. While a ringer set to a medium or high volume will certainly disrupt neighbors in an office environment, even a phone set to the lowest ringer volume is still likely to annoy neighboring workers when the phone rings constantly without being answered. For example, some users are often away from their desks for meetings, or wear headphones to listen to music while working at their desks, either of which may result in frequently unanswered incoming calls that ring for a full 15-30 seconds before going to voicemail.

In general, embodiments of the invention provide a system, a method, and a computer readable medium for dynamic model-based ringer profiles. As described herein a desk phone records incoming call records that provide insight into the call answering patterns of the phone's user. The incoming call records may be used to build a ringer model. The ringer model may be informed by contemporaneous information received from other sources, where such information includes the user's calendar, the user's location, or a state of the environment of the phone at the time the incoming calls were received. The ringer profile may be built on the desk phone, or remotely by another device and sent to the desk phone over a network. Once the ringer model has been built, ringer profiles may be generated by applying the ringer model to current data, such as a current day and time, a current location of the phone's user, and a current state of the phone's environment. When a ringer profile is implemented by a desk phone, the ringer profile may control any characteristic of the desk phone's ringer, such as the duration and volume at which the phone's ringer sounds a ringtone. The ringer model may be used to generate a new ringer profile whenever an update is appropriate. For example, a new ringer profile may be implemented at a phone once a month, once a week, once a day, or once an hour. In this way, the desk phone is dynamically configured to ensure an incoming call can be answered by the intended recipient while minimizing the sound output by the phone to its environment.

FIG. 1 shows an environment 100 for dynamic model-based ringer profiles according to one or more embodiments. Although the elements of the environment 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1 may be omitted, repeated, and/or substituted. Accordingly, various embodiments may lack one or more of the features shown. For this reason, embodiments of the invention should not be considered limited to the specific arrangements of elements shown in FIG. 1.

As depicted in FIG. 1, the environment 100 includes a workstation 102. The environment 100 also includes one or more neighboring workstations 103. For example, as shown in FIG. 1, neighboring workstations 103a-103c are shown in proximity to the workstation 102. As used herein, the workstation 102 includes any workspace in which a person (i.e., a user, an individual, etc.) may engage in one or more tasks. A neighboring workstation 103 includes any workspace proximate to the workstation 102 such that audio originating from the workstation 102 can be heard at the neighboring workstations 103. A workstation may include, for example, a desk, a cubicle, a conference room, and/or an office. Accordingly, as shown in FIG. 1, the neighboring workstations 103 are desks or cubicles adjacent to the workstation 102. As shown in FIG. 1, the neighboring workstations 103a and 103b each include a neighboring user 104—neighboring users 104a and 104b, respectively.

The workstation 102 includes a desk phone 105. The desk phone 105 includes any desk resident hardware device that may be used to receive incoming telephone calls, and which includes a ringer (e.g., ringer circuit, software controlled loudspeaker, etc.) for alerting a user of the incoming calls. The desk phone 105 may be in communication with a central call control system. The desk phone 105 may include logic for registering to a private branch exchange (PBX) (e.g., a VoIP PBX, etc.). The desk phone 105 may include logic for directly communicating with a headset. In one or more embodiments, the desk phone 105 may include a VoIP desk phone, which sends and receives voice communications over an Internet Protocol (IP) network.

As depicted in FIG. 1, a user that works at the workstation 102 is currently absent from the workstation 102. He or she may be working elsewhere in the environment 100, or outside of the environment 100. For example, he or she may be working from home, on vacation, at a meeting, or in his or her laboratory. Accordingly, any incoming calls to the desk phone 105 will cause the desk phone 105 to ring into the environment 100, before terminating unanswered. The incoming calls may cause the desk phone 105 to ring for a predetermined amount of time before going to voicemail, or the desk phone 105 may ring until the calling party terminates the call (i.e., hangs up). In prior art desk phones, the predetermined amount of time is a static value (e.g., 15 seconds, 20 seconds, 30 seconds, etc.) used for all incoming calls. Moreover, in prior art desk phones, the ringer sounds at a static volume level configured by the phone's user. Accordingly, in prior art phone systems, even if the ringer of a desk phone is set to some fraction of maximum volume, the ringer may disrupt the concentration of neighboring users because it will sound at a fixed volume for some fixed duration of time.

According to the systems and methods disclosed herein, the desk phone 105 is dynamically configured to optimize its ringer output in a manner that balances the likelihood of alerting the user associated with the desk phone 105 of the incoming call with reducing the cumulative auditory emissions of the desk phone 105 into the environment 100. In other words, according to the systems and methods disclosed herein, the desk phone 105 may be configured to ring just long enough and loud enough for its user to hear the desk phone 105 ringing, while at the same time minimizing disruption to the neighboring users 104. When these systems and methods are implemented across all desk phones in the environment 100, the aggregate effect may be a substantial decrease in auditory disturbances in the environment 100, and an overall increase in user productivity.

Figure 2:
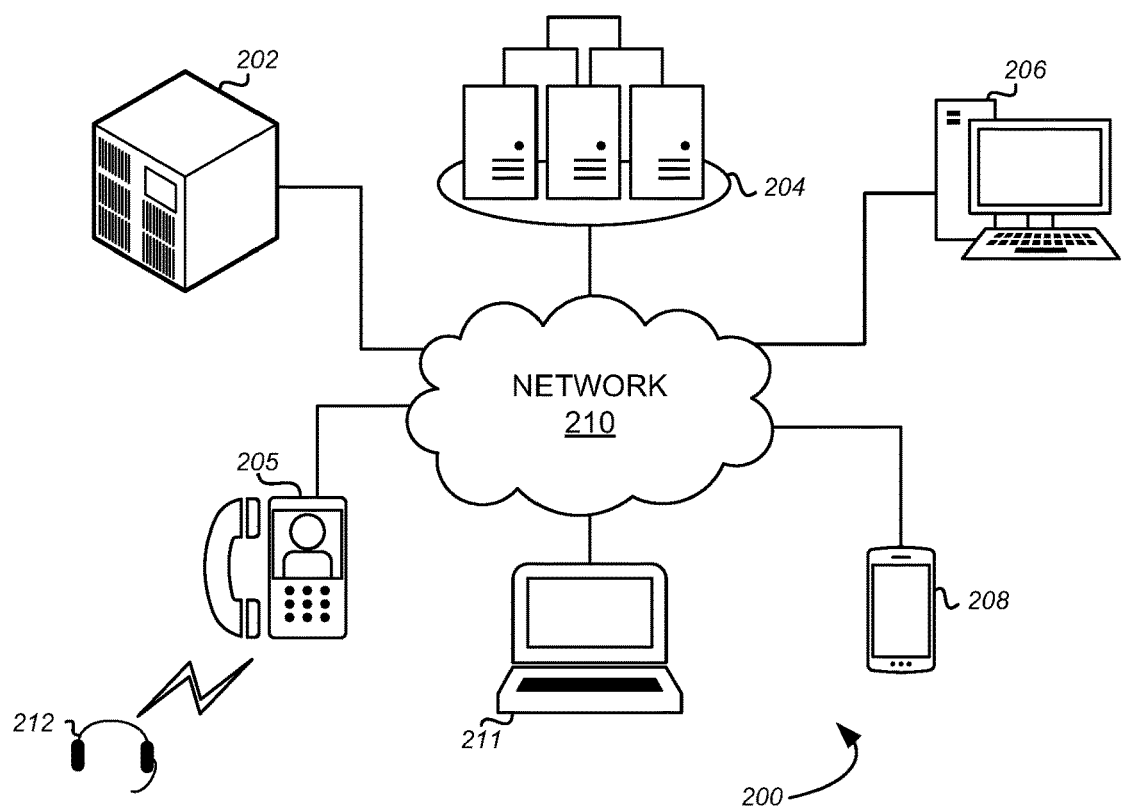
FIG. 2 depicts a system for dynamic model-based ringer profiles, in accordance with one or more embodiments.

FIG. 2 shows system 200 for dynamic model-based ringer profiles according to one or more embodiments. Although the elements of the system 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2 may be omitted, repeated, and/or substituted. Accordingly, various embodiments may lack one or more of the features shown. For this reason, embodiments of the invention should not be considered limited to the specific arrangements of elements shown in FIG. 2.

As depicted in FIG. 2, the system 200 includes a desk phone 205, a computing device 211, a mobile device 208, a call control server 202, a ringer profile server 204, and an environmental status server 206, each of which are communicatively coupled to a network 210. As described herein, the network 210 includes any private and/or public communications network, wired and/or wireless, such as a local area network (LAN), wide area network (WAN), and/or the Internet. Via the network 210, one or more of the call control server 202, the ringer profile server 204, the environmental status server 206, the desk phone 205, the computing device 211, and the mobile device 208 may communicate with the other devices coupled to the network 210.

The desk phone 205 may be substantially identical to the desk phone 105, described above in the context of FIG. 1. In one or more embodiments, the desk phone 205 may be coupled to a headset 212. The coupling between the headset 212 and the desk phone 205 may include a physical coupling and/or a wireless coupling (e.g., a DECT link, a Bluetooth link, etc.).

As described herein, the call control server 202 includes one or more remote computing devices that are accessible to the desk phone 205 over the network 210, and that monitors and manages voice communications destined for and received at the desk phone 205. For example, the call control server 202 may monitor the status of the desk phone 205, establish connections to/from the desk phone 205, modify parameters of connections at the desk phone 205, terminate connections at the desk phone 205, and/or restart failed connections at the desk phone 205. The call control server 202 may include, for example, a session initiation protocol (SIP) server, a Real-time Transport Protocol (RTP) server, and/or a Real-time Transport Control Protocol (RTCP) server. In one or more embodiments, the call control server 202 may include an IP PBX. Accordingly, the call control server 202 may notify the desk phone 205 of incoming calls, and/or send a ring signal or command to the desk phone 205.

The computing device 211 includes any computing device also associated with the user that is associated with the desk phone 205. For example, a line or extension of the user of the computing device 211 may be assigned to the desk phone 205. The computing device 211 may include a desktop computer, a laptop computer, a terminal, etc. Similarly, the mobile device 208 includes any portable electronic device also associated with the user that is associated with the desk phone 205. For example, a line or extension of the user of the mobile device 208 may be assigned to the desk phone 205. The mobile device 208 may include a cellular phone, a portable music player, a smartphone, a tablet computer, etc.

In one or more embodiments, the location of the computing device 211 and/or the mobile device 208 may be reported to the ringer profile server 204. For example, the computing device 211 may report its location to the ringer profile server 204, and the mobile device 208 may report its location to the ringer profile server 204. When in a known environment, such as the environment 100 described in reference to FIG. 1, above, the computing device 211 and/or mobile device 208 may determine its location based on RSSI sampling and/or trilateration of beacon signals, such as broadcasts from Wi-Fi access points and/or Bluetooth beacons. Still further, the computing device 211 and/or the mobile device 208 may determine its location using an integrated global positioning system (GPS) receiver.

In one or more embodiments, the computing device 211 and/or the mobile device 208 may report recorded calendar events to the ringer profile server 204. For example, using data in a mail client or calendar client on the computing device 211 and/or the mobile device 208, the device may report one or more of a user's meetings, appointments, and vacations to the ringer profile server 204.

The environmental status server 206 includes any computing device operable to report information regarding the environment of the desk phone 205 to the ringer profile server 204. In one or more embodiments, the environmental status server 206 may include a sound masking system that is outputting a sound masking signal into the environment of the desk phone 205, such that the environmental status server 206 reports information regarding the operation of the sound masking system. For example, the environmental status server 206 may periodically report the volume of the sound masking signal being output to the environment, and/or the volume of ambient audio measured in the environment. In one or more embodiments, the environmental status server 206 may include an access control system that controls access to the environment of the desk phone 205, such that the environmental status server 206 reports information regarding the user density of the environment. For example, based at least in part on badge scans performed at access controlled doors, the environmental status server 206 may periodically report the number of people that are currently in the environment.

In one or more embodiments, the desk phone 205 may record information regarding incoming calls to the desk phone 205, herein referred to as "incoming call records." For example, the desk phone 205 may record to an incoming call record whether an incoming call is answered or unanswered, the duration of time a ringer of the desk phone 205 was sounded before the incoming call was answered, the ringer volume(s) that were used to alert a user of the incoming call, and/or whether the user was wearing a headset when he or she was alerted of the incoming call.

In one or more embodiments, the desk phone 205 may dynamically apply ringer profiles that control how the desk phone 205 alerts of an incoming call. For example, a first ringer profile may be used by the desk phone 205 for sounding its ringer during a first time period (e.g., 30 minutes, 1 hour, 4 hours, etc.), and a second ringer profile may be used by the desk phone 205 for sounding its ringer during a second time period subsequent to the first time period. Accordingly, when an incoming call is received at the desk phone 205 during the first time period, the desk phone 205 may sound a ringtone according to the first ringer profile; and when an incoming call is received at the desk phone 205 during the second time period, the desk phone 205 may sound a ringtone according to the second ringer profile. Still yet, and as a further example, a third ringer profile may be used by the desk phone 205 for sounding its ringer during the second time period when the desk phone 205 has determined that the headset 212 is attached and/or is being worn by a user. Accordingly, a ringer profile may include instructions to use the ringer profile for a specified time period and/or only when one or more conditions are met.

In one or more embodiments, the desk phone 205 may receive the ringer profiles from the ringer profile server 204. As described herein, the ringer profile server 204 includes any computing device remote from the desk phone 205 that is operable to receive over the network 210 one or more call records, and to return ringer profiles over the network 210 to the desk phone 205. In such embodiments, the desk phone 205 may send its incoming call records to the ringer profile server 204. Using the incoming call records, the ringer profile server 204 may build a ringer model for a user of the desk phone 205. In one or more embodiments, the ringer model may be informed by information reported by one or more of the call control server 202, the environmental status server 206, the computing device 211, and the mobile device 208. For example, the ringer model may be informed by calendar information, device location information, etc. reported by the computing device 211 and/or the mobile device 208. As another example, the ringer model may be informed by user density estimates, the level of ambient audio detected in the environment, and/or the volume of a sound masking signal output to the environment of the desk phone 205.

Further, the ringer profile server 204 may apply a ringer model to data to generate a ringer profile for the desk phone 205. The data may be associated with a current point in time. The current data may include any information tracked or reported by one or more of the ringer profile server 204, the call control server 202, the desk phone 205, the environmental status server 206, the computing device 211, and the mobile device 208. For example, the current data may include a current date and/or a current time. As another example, the current data may include calendar information of a user (e.g., appointments, vacations, etc.), and/or a location of one or more of a user's devices (e.g., the computing device 211, the mobile device 208, etc.). Also, for example, the current data may include current user density estimates, the current level of ambient audio detected in the environment of the desk phone 205, and/or the current volume of a sound masking signal output to the environment of the desk phone 205.

In one or more embodiments, the desk phone 205 may build a model locally using its incoming call records. The model may be informed by information reported by one or more of the call control server 202, the environmental status server 206, the computing device 211, and the mobile device 208, as described above. In such embodiments, the desk phone 205 may apply the model to data to generate a ringer profile for the desk phone 205. The data may be associated with a current point in time. The current data may include any information reported by one or more of the call control server 202, the environmental status server 206, the computing device 211, and the mobile device 208, as described above.

When operating in accordance with the methods and systems described herein, the ringer profile server 204 is generally agnostic to any interaction between the call control server 202 and the desk phone 205. In other words, the transmission of incoming call records from the desk phone 205 to the ringer profile server 204, and the receipt of ringer profiles at the desk phone 205 from the ringer profile server 204 may proceed independent of any interaction between the desk phone 205 and the call control server 202. Similarly, the call control server 202 is generally agnostic to any interaction between the ringer profile server 204 and the desk phone 205. In other words, traditional call management functions, which may be mediated using known VoIP protocols, such as, for example, SIP messaging, may proceed independent of any interaction between the desk phone 205 and the ringer profile server 204. Thus, the desk phone 205 may be operable to implement ringer profiles received from the ringer profile server 204 without a specialized call control system.

Figure 3:
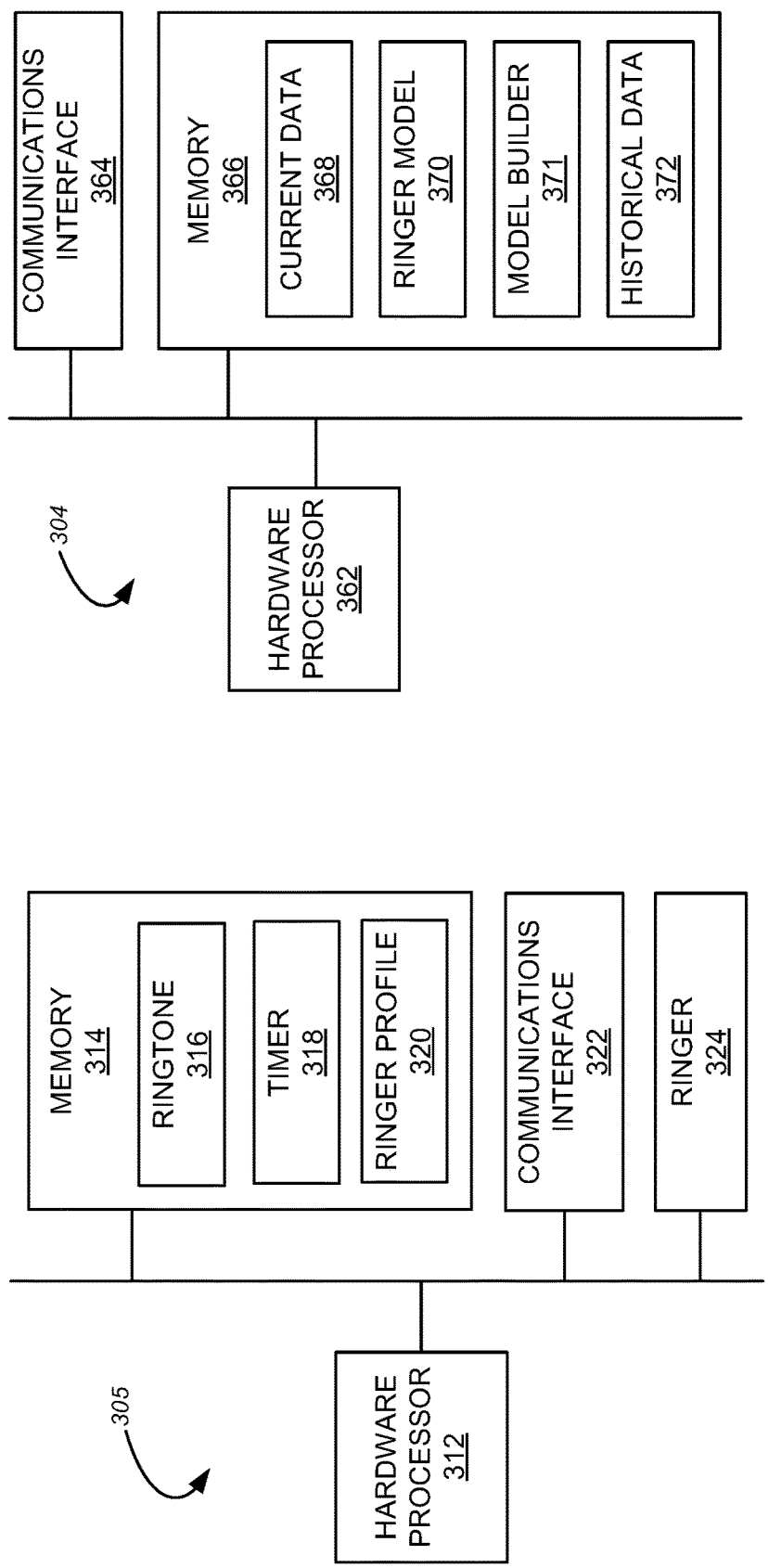
FIG. 3A shows a block diagram of a desk phone for dynamic model-based ringer profiles, in accordance with one or more embodiments.
FIG. 3B shows a block diagram of a ringer profile server for dynamic model-based ringer profiles, in accordance with one or more embodiments.

FIG. 3A shows a block diagram of a desk phone 305 for dynamic model-based ringer profiles, according to one or more embodiments. Although the elements of the desk phone 305 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 3A may be omitted, repeated, and/or substituted. Accordingly, various embodiments may lack one or more of the features shown. For this reason, embodiments of the invention should not be considered limited to the specific arrangements of elements shown in FIG. 3A. The elements of the desk phone 305 may be implemented in hardware, software, or combinations thereof. The desk phone 305 may be substantially identical to the desk phone 105 or the desk phone 205, described in the context of FIGS. 1 and 2, respectively, above.

As shown in FIG. 3A, the desk phone 305 includes a hardware processor 312 operably coupled to a memory 314, a communications interface 322, and a ringer 324. In one or more embodiments, the hardware processor 312, the memory 314, the communications interface 322, and the ringer 324 may remain in communication over one or more communications busses.

As described herein, the communications interface 322 includes any interface for communicating, using digital and/or analog signals, with one or more other devices over a network. The network may include the network 210, described above in reference to FIG. 2. Via the communications interface 322, the desk phone 305 may send incoming call records to one or more remote devices over the network. For example, via the communications interface 322, the desk phone 305 may send incoming call records to a ringer profile server. Also, via the communications interface 322, the desk phone 305 may receive an incoming call signal or command from one or more remote devices. For example, via the communications interface 322, the desk phone 305 may receive an SIP INVITE message from a call control server.

In one or more embodiments, the desk phone 305 may include one or more user controls. User controls may include any mechanism of the desk phone 305, mechanical and/or electronic, that responds to user operation. The user controls may include one or more of a button, a switch, a capacitive sensor, a touch screen, etc. The user controls may be manipulated to initiate an outgoing call, to answer an incoming call, and/or to adjust a setting.

As described herein, the memory 314 includes any storage device capable of storing information temporarily or permanently. The memory 314 may include volatile and/or non-volatile memory, and may include more than one type of memory. For example, the memory 314 may include one or more of SDRAM, ROM, and flash memory. In one or more embodiments, the memory 314 may store pairing information for connecting with a headset, user preferences, and/or an operating system (OS) of the desk phone 305.

As depicted in FIG. 3A, the memory 314 stores a ringtone 316, a timer 318, and a ringer profile 320. The ringtone 316 includes a stored audio file that may be output by the ringer 324. The ringer 324 includes any device that sounds an audible alert to notify a user of an incoming call at the desk phone 305. The audible alert output by the ringer 324 may include the ringtone 316. The ringtone 316 may include, for example, a pre-recorded audio file (e.g., way, mp3, aiff, etc.). The ringtone 316 may be selected by a user of the desk phone 305. The ringer 324 may include, for example, a speaker or electronic ringer circuit. The ringer 324 may be activated in response to a signal or command received over a network (e.g., a SIP INVITE message, etc.).

As described herein, the ringer profile 320 provides a volume level instruction for each of one or more points in time within a duration for sounding an audible alert, such as the ringtone 316, by the ringer 324 when an incoming call is received at the desk phone 305. For example, the ringer profile 320 may include a first instruction for 100% ringer volume for the initial 3 seconds that the ringtone 316 is sounded by the ringer 324, and a second instruction for 50% ringer volume for the subsequent 12 seconds that the ringtone 316 is sounded by the ringer 324. As another example, the ringer profile 320 may include a first instruction for 80% ringer volume for the initial 5 seconds that the ringtone 316 is sounded by the ringer 324, a second instruction for 40% ringer volume for the second 5 seconds that the ringtone 316 is sounded by the ringer 324, and a third instruction for 10% ringer volume for the third 5 seconds that the ringtone 316 is sounded by the ringer 324. As a further example, the ringer profile 320 may include a first instruction for 40% ringer volume for the initial 7 seconds that the ringtone 316 is sounded by the ringer 324, a second instruction for 5% ringer volume for the next 3 seconds that the ringtone 316 is sounded by the ringer 324, and a third instruction for 0% ringer volume for the remaining duration of time (e.g., 0 seconds, 3 seconds, 10 seconds, etc.) the ringtone 316 is sounded by the ringer 324. Still yet, as another example, the ringer profile 320 may include a first instruction for 60% ringer volume tapering to 30% ringer volume for the initial 7 seconds that the ringtone 316 is sounded by the ringer 324, and a second instruction for 30% ringer volume tapering to 0% ringer volume for the next 3 seconds that the ringtone 316 is sounded by the ringer 324. As a further example, the ringer profile 320 may include a first instruction for 65% ringer volume for the initial 5 seconds that the ringtone 316 is sounded by the ringer 324, and 0% ringer volume after the initial 5 seconds.

In one or more embodiments, the ringer profile 320 may be periodically replaced. For example, the desk phone 305 may receive, from a ringer profile server, the ringer profile 320 for use for a first period of time (e.g., 30 minutes, 1 hour, 2 hours, etc.), and subsequently receive, from the ringer profile server, another ringer profile for use for a second period of time (e.g., 30 minutes, 1 hour, 2 hours, etc.). As another example, in embodiments in which the desk phone 305 generates the ringer profile 320, the desk phone 305 may generate the ringer profile 320 for use for a first period of time, and subsequently generate another ringer profile for use for a second period of time. Accordingly, the ringer profile 320 may include a time period instruction that limits the hours, days, duration of time, etc. during which the ringer profile 320 may be used by the desk phone 305.

In one or more embodiments, the desk phone 305 may store a plurality of ringer profiles. Each of the ringer profiles may be associated with a different time period. For example, a first ringer profile may be associated with the hours of 12 AM-12 PM, such that it is active in the morning, and a second ringer profile may be associated with the hours of 12 PM-12 AM, such that it is active in the afternoon. As another example, a first ringer profile may be associated with the hours of 12 AM-8 AM and 3 PM-12 AM, such that it is active in the early morning and late afternoon, and a second ringer profile may be associated with the hours of 8 AM-3 PM, such that it is active in the late morning and early afternoon. As a further example, a first ringer profile may be associated with the days Monday, Tuesday, Wednesday, and Thursday, such that it is active on those days, and a second ringer profile may be associated with Friday, such that it is active only on Fridays. In embodiments where the desk phone 305 stores a plurality of ringer profiles, each of the ringer profiles may be associated with a different condition at the desk phone 305. For example, a first ringer profile may be active only when a headset is coupled to the desk phone 305, and a second ringer profile may be active when the headset is not coupled to the desk phone 305. In any case, the ringer profile 320 may be activated because of one or more conditions related to day, time of day, user location, and headset attachment, and be referred to as the current ringer profile.

The timer 318 includes any routine resident in the memory 314 operable to record a time elapsed prior to a user answering an incoming call to the desk phone 305. For example, the timer 318 may record the time elapsed between an incoming call signal or command being received at the desk phone 305, and the incoming call being answered. As another example, the timer 318 may record the time elapsed between the ringer 324 sounding an audible alert for the call, and the call being answered. Accordingly, the timer 318 may record that it takes 4 seconds for a user to answer a first incoming call at the desk phone 305, 13 seconds for the user to answer a second incoming call at the desk phone 305, 5 seconds for the user to answer a third incoming call at the desk phone 305, etc. Each of these elapsed times may be recorded to incoming call records, and reported to a ringer profile server, as described below.

FIG. 3B shows a block diagram of a ringer profile server 304 for dynamic model-based ringer profiles according to one or more embodiments. Although the elements of the ringer profile server 304 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 3B may be omitted, repeated, and/or substituted. Accordingly, various embodiments may lack one or more of the features shown. For this reason, embodiments of the invention should not be considered limited to the specific arrangements of elements shown in FIG. 3B. The elements of the ringer profile server 304 may be implemented in hardware, software, or combinations thereof. The ringer profile server 304 may be substantially identical to the ringer profile server 204 described in the context of FIG. 2, above.

As shown in FIG. 3B, the ringer profile server 304 includes a hardware processor 362 operably coupled to a memory 366, and a communications interface 364. In one or more embodiments, the hardware processor 362, the memory 366, and the communications interface 364, may remain in communication over one or more communications busses.

As described herein, the memory 366 includes any storage device capable of storing information temporarily or permanently. The memory 366 may include volatile and/or non-volatile memory, and may include more than one type of memory. For example, the memory 366 may include one or more of SDRAM, ROM, flash memory, and a hard disk drive. As depicted in FIG. 3B, the memory 366 stores current data 368, a model builder 371, a ringer model 370, and historical data 372.

The communications interface 364 includes any interface for communicating, using digital and/or analog signals, with one or more other devices over a network. The network may include the network 210, described above in reference to FIG. 2. Via the communications interface 364, the ringer profile server 304 may receive incoming call records from the desk phone 305. Also, via the communications interface 364, the ringer profile server 304 may receive calendared events and/or location information from a computing device and/or mobile device, such as the computing device 211 and the mobile device 208, described above in reference to FIG. 2. Further, via the communications interface 364 the ringer profile server 304 may receive information regarding an environment of the desk phone 305 from an environmental status server, such as the environmental status server 206, described in reference to FIG. 2, above.

Any of the aforementioned data (i.e., incoming call records, location information, calendared events, environmental information, etc.) received at the ringer profile server 304 for a current time period may be stored as the current data 368, and any of the aforementioned data received at the ringer profile server 304 prior to the current time period (i.e., during a prior time period, etc.) may be stored as the historical data 372. The current time period may include, for example, the last 12 hours, the last 2 hours, the last hour, the last 15 minutes, the last 5 minutes, etc. For example, when the current time period includes the last hour, an incoming call record generated by the desk phone 305 less than 30 minutes prior may be included in the current data 368. Accordingly, in such an example, any incoming call records generated by the desk phone 305 that are greater than one hour old may be included in the historical data 372. Similarly, one or more of an event calendared for the current time period, location information for the current time period, and environmental information regarding a current state of the environment of the desk phone 305 may be included in the current data 368; and events occurring during the prior time period, location information received during the prior time period, and environmental information regarding a state of the environment of the desk phone 305 during the prior time period may be included in the historical data 372. The prior time period may encompass a period of days, weeks, months, or years. In one or more embodiments, the current data 368 includes the current time at the desk phone 305 (e.g., 8:00 AM, 9:44 AM, 1:45 PM, etc.) and/or the current day (e.g., Monday, Wednesday, August 30, November 18, etc.).

In one or more embodiments, information may be moved from the current data 368 to the historical data 372. For example, a rolling 30-minute window, 1-hour window, 2-hour window, etc. may be used to move information received outside of the window to the historical data 372. As another example, the information may be moved once an hour, once every 2 hours, etc., as determined by the length of time that defines the current time period.

In one or more embodiments, the ringer model 370 is built by the model builder 371. The model builder 371 may include any learning algorithm operable to train the ringer model 370 using the historical data 372. The model builder 371 may include, for example, a classification algorithm, a regression algorithm, an association algorithm, a prediction algorithm, and/or a clustering algorithm. In this way, the ringer model 370 is a predictive model specifically tuned to the habits of a user of the desk phone 305, as reflected in the historical data 372. In one or more embodiments, the ringer profile server 304 generates a ringer profile by applying the ringer model 370 to the current data 368. Once a ringer profile has been generated, the ringer profile may be transmitted, via the communications interface 364, to the desk phone 305. As an option, the ringer model 370 may be validated using a portion of the historical data 372.

In one or more embodiments, the contents of the memory 366 may instead be implemented in the memory 314 of the desk phone 305. In other words, the desk phone 305 may store the historical data 372 and current data 368. Also, the desk phone 305 may include the model builder 371 for building the ringer model 370, as described above. In other words, in such embodiments, the desk phone 305 is capable of locally building a ringer model using historical data, and locally applying the ringer model to current data for generating a ringer profile (i.e., the ringer profile 320), without assistance of the remote ringer profile server 304.

Figure 4:
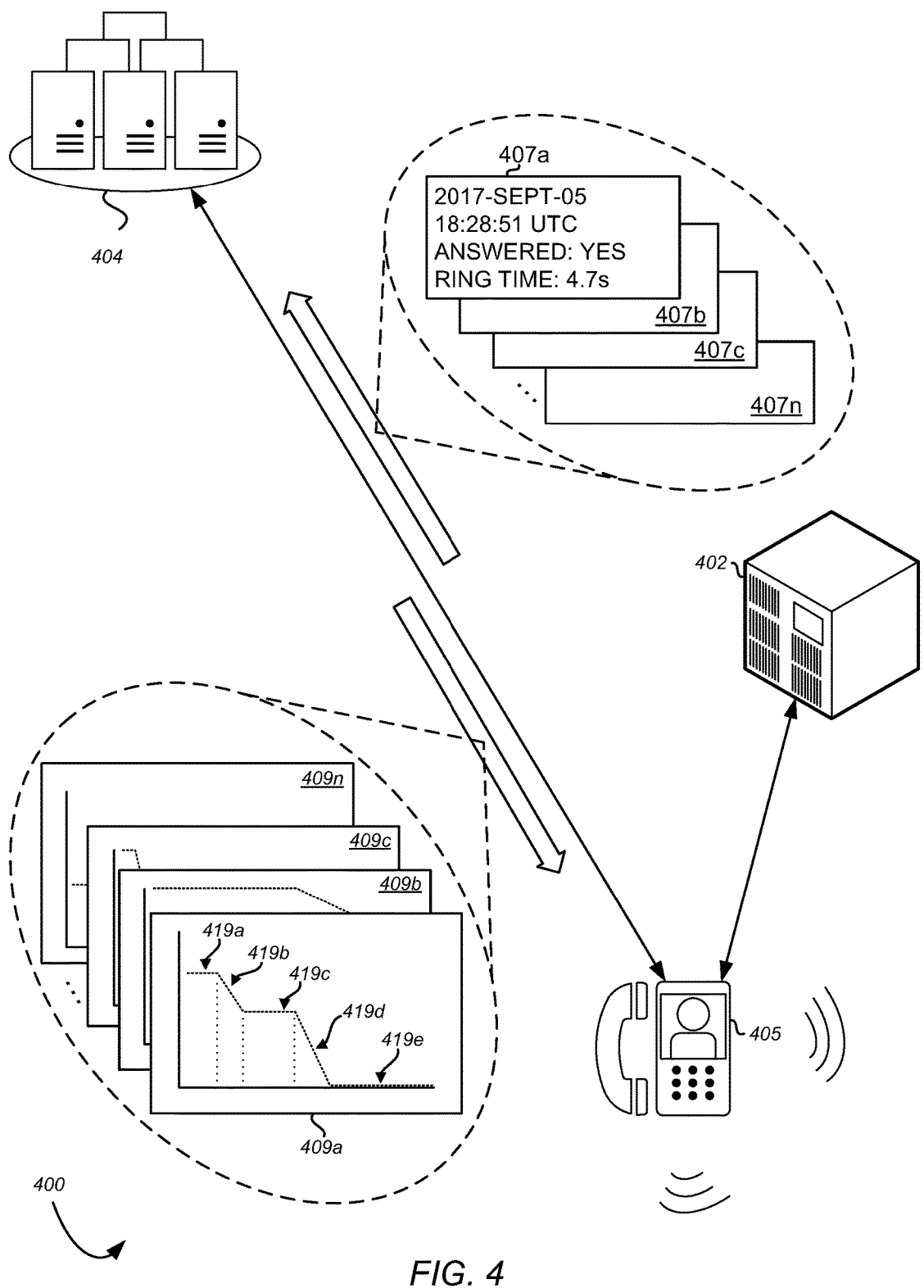
FIG. 4 shows a system for dynamic model-based ringer profiles, in accordance with one or more embodiments.

FIG. 4 shows a system 400 for dynamic model-based ringer profiles according to one or more embodiments. Although the elements of the system 400 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 4 may be omitted, repeated, and/or substituted. Accordingly, various embodiments may lack one or more of the features shown. For this reason, embodiments of the invention should not be considered limited to the specific arrangements of elements shown in FIG. 4.

The system 400 includes a desk phone 405 communicatively coupled to a ringer profile server 404 and a call control server 402. The desk phone 405 may communicate with the ringer profile server 404 and the call control server 402 over a network, such as the network 210 described in reference to FIG. 2, above. The desk phone 405 may be substantially identical to any of the desk phones 105, 205, 305, described in reference to FIGS. 1, 2, and 3A-3B, above. Similarly, the ringer profile server 404 may be substantially identical to any of the ringer profile servers 204, 304, described in reference to FIGS. 2 and 3A-3B, above. The call control server 402 may be substantially identical to the call control server 202 described in reference to FIG. 2, above.

As depicted in FIG. 4, the desk phone 405 sends a number of incoming call records 407 (i.e., incoming call records 407a . . . 407n) to the ringer profile server 404. Each of the incoming call records 407 may be associated with a different incoming call to the desk phone 405. An incoming call record 407 may include a value indicating whether the call associated with the incoming call record 407 was or was not answered at the desk phone 405. Whenever an incoming call is received at the desk phone 405, the desk phone 405 may record the time it takes for the call to be answered at the desk phone 405. Accordingly, an incoming call record 407 may include a value indicating the time elapsed prior to the incoming call being answered. Also, an incoming call record 407 may include a value indicating whether or not a headset was connected to the desk phone 405 when the associated call was received. In one or more embodiments, an incoming call record 407 may include a date and time of the received call for which the incoming call record 407 was generated. For example, and referring to FIG. 4, a first incoming call record 407a indicates that a call received at 18:28:51 UTC on Sep. 5, 2017 was answered after the desk phone 405 rang for 4.7 seconds. In other embodiments, the incoming call records 407 may not include a date and/or timestamp. Accordingly, the ringer profile server 404 may determine the date and time of the call based on the date and time the incoming call record 407 is received. Using the date and time information associated with the incoming call records 407, the ringer profile server 404 may correlate the incoming call records 407 with data received from other systems, such as proximity information from a user's mobile device.

In one or more embodiments, the incoming call records 407 may be transmitted to the ringer profile server 404 whenever the associated call is received. In other words, a new incoming call record 407 may be generated by the desk phone 405 and transmitted to the ringer profile server 404 in response to each incoming call at the desk phone 405. In one or more embodiments, the incoming call records 407 may be aggregated by the desk phone 405 and periodically transmitted (e.g., every 15 minutes, every 30 minutes, every hour, once a day, etc.), or may be transmitted once a threshold number of incoming call records 407 are collected (e.g., 3 records, 5 records, 10 records, etc.). The incoming call records 407 may be formatted in any suitable manner. For example, the incoming call records 407 may sent in JavaScript Object Notation (JSON) or eXtensible Markup Language (XML) formatting to the ringer profile server 404.

In one or more embodiments, an incoming call record 407 may include data indicating the volume with which the ringer sounded for the incoming call. For example, the first incoming call record 407a may indicate that the ringer of the desk phone 405 was sounded at a particular volume (e.g., 10% volume, 70% volume, etc.). In one or more embodiments, an incoming call record 407 may include data indicating which of the ringer profiles 409 was applied for sounding the ringer for the incoming call. For example, the first incoming call record 407a may indicate that the desk phone 405 rang according to a third ringer profile 409c when the associated incoming call was received.

Still referring to FIG. 4, the desk phone 405 is illustrated to receive a number of ringer profiles 409 (i.e., ringer profiles 409a . . . 409n) from the ringer profile server 404. Each of the ringer profiles 409 includes a volume level instruction for each of two or more points in time. The ringer profiles 409 may be received by the desk phone 405 sequentially over a period of time, such that a newly received ringer profile 409a replaces a previously received ringer profile 409b, or two or more of the ringer profiles 409 may be received and stored together. In one or more embodiments, a ringer profile 409 is received from the ringer profile server 404 with an instruction that associates the ringer profile 409 with a particular time period. For example, the ringer profile server 404 may instruct that a ringer profile 409 should be used for the next hour, 2 hours, 4 hours, etc. The ringer profile server 404 may send a new ringer profile 409 at the expiration of a prior time period. In this way, the ringer profile 404 may periodically send new ringer profiles 409 that are tailored to a status of a user of the desk phone 405, as well as a current state of the environment of the desk phone 405. Thus, a first ringer profile 409a may include volume level instructions for a first time period, and each of the ringer profiles 409b-409n may provide volume level instructions different than those in the first ringer profile 409a, and which were applicable during prior time periods.

For example, assume a single user is associated with the desk phone 405. The ringer profile server 404 receives and stores the incoming call records 407 collected by the desk phone 405. Further, based on the received incoming call records 407, the ringer profile server 404 builds a ringer model. The ringer model demonstrates that the user of the desk phone 405 answers 60% of his or her answered incoming calls within 2 seconds, 90% of his or her answered incoming calls within 5 seconds, and 99% of his or her answered incoming calls within 7 seconds. Accordingly, if an incoming call to the desk phone 405 is not answered within 7 seconds, it is unlikely that the user will answer the call. A ringer profile 409, provided by the ringer profile server 404 to the desk phone 405, is generated by a ringer model built on incoming call records 407 evidencing these patterns.

For example, as depicted in FIG. 4, the first ringer profile 409a includes a first instruction 419a to sound a ringer at 75% volume for 2 seconds, a second instruction 419b to taper the ringer volume from 75% to 50% over the next 1 second, a third instruction 419c to sound the ringer at 50% volume for the next 2 seconds, a fourth instruction 419d to taper the ringer volume from 50% to 0% over the next 2 seconds, and a fifth instruction 419e to maintain the ringer at 0% volume for the subsequent 8 seconds. In other words, when the first ringer profile 409a is implemented by the desk phone 405, the volume of the ringer of the desk phone 405 dynamically decreases over time, reducing its audibility to persons in the vicinity of the desk phone 405. Further, the desk phone 405 will only audibly ring for 7 seconds when an incoming call is received during a period in which the first ringer profile 409a is active. Thus, the first ringer profile 409a ensures that the user of the desk phone 405 is no less likely to answer an incoming call within his or her established norms, while limiting the emission of sound into the environment of the desk phone 405.

Of course, the first ringer profile 409a as depicted in FIG. 4 is simply one example, and is not intended to be limiting in anyway. For example, given the facts above, a suitable ringer profile 409 may instead instruct the desk phone 405 to ring at a volume of 80% for 2 seconds, drop to a volume of 60% for the next 3 seconds, then a volume of 10% for the next 2 seconds, and then linearly decay to 0% for a final 3 seconds. As another example, a suitable ringer profile 409 may instruct the desk phone 405 to ring at 100% volume for 2 seconds, 30% volume for 5 seconds, and then 0% volume. In any case, the ringer profile 409 is generated using a model that accounts for patterns in the incoming call answer history of the desk phone 405.

Still yet, the call answering habits of the user associated with the desk phone 405 may change due to any number of circumstances. For example, the user may be under a project deadline, may have a rotating work from home schedule, may be spending more time in a lab, or may have been promoted into a new role. As a result, the user may be spending more or less time, in general, in the vicinity of his or her desk. Also, the user may be spending more or less time, during specific time periods on specific days, in the vicinity of his or her desk. These patterns may be reflected in the incoming call records 407, which indicate that the user is answering incoming calls at the desk phone 405 more frequently or less frequently. Also, the user may answer the incoming calls to the desk phone 405 after a greater or shorter period of ringing, depending on patterns noted above. Accordingly, based on the incoming call records 407 from such incoming calls, the ringer profile server 404 may update a ringer model, and provide one or more new ringer profiles 409 that account for such behavioral patterns.

For example, the ringer profile server 404 may build a ringer model that results in a shorter ring duration for incoming calls received in the afternoon (e.g., when 90% are answered within 2 seconds, 95% within 4 seconds, etc.) relative to those received in the morning (e.g., when 50% are answered within 2 seconds, 80% within 9 seconds, etc.). Accordingly, the ringer profile server 404 may generate and transmit to the desk phone 405 a second ringer profile 409b that the desk phone 405 uses during the morning, and a third ringer profile 409c that the desk phone 405 uses during the afternoon. As a result, the desk phone 405 outputs rings of a different volume and duration during the morning than the desk phone 405 outputs during the afternoon.

Additional correlations that may influence the ringer profiles 409 include, for example, environmental factors (e.g., sound masking volume, user density, etc.), whether the user of the desk phone 405 is wearing a headset, and/or the proximity of the user to the desk phone 405. For example, the ringer profile server 404 may generate ringer profiles 409 that cause the ringer of the desk phone 405 to sound at a greater volume when the user of the desk phone 405 is not wearing a headset relative to when the user is wearing a headset. As another example, the ringer profile server 404 may generate ringer profiles 409 that cause the ringer of the desk phone 405 to ring for a longer period of time when the user of the desk phone 405 is not wearing a headset relative to when the user is wearing a headset. As yet another example, the ringer profile server 404 may generate ringer profiles 409 that cause the desk phone 405 to ring silently when the user of the desk phone 405 is beyond a predetermined distance from the desk phone 405.

In one or more embodiments, the desk phone 405 may include one or more user controls for providing user feedback regarding a ringer profile 409 to the ringer profile server 404. For example, via user controls on the desk phone 405, the user may communicate to the ringer profile server 404 a preference for a ringer with a longer duration or a shorter duration. Also, via the user controls on the desk phone 405, the user may communicate to the ringer profile server 404 a preference for a ringer having a greater volume or a ringer having a lesser volume. In such embodiments, the user feedback may be accounted for in a model created by the ringer profile server 404 for generating the ringer profiles 409. In other words, rather than simply increasing or decreasing the volume of the ringer of the desk phone 405, the ringer profile server 404 can correlate a user's ringer preferences with other factors, such as a user density of an environment, user proximity, time, day, etc., when building or updating ringer models.

In one or more embodiments, the desk phone 405 may engage in a training phase when it is first installed or assigned to a user. During the training phase, the desk phone 405 may ring at a fixed volume for a fixed duration. As an option, the training phase may include different combinations of predetermined ringer volumes and ringer durations. Any incoming call records 407 generated during the training phase may be used to build an initial ringer model for the user of the desk phone 405. Moreover, any incoming call records 407 generated during the training phase may be used to establish a baseline answer time for the user of the desk phone 405. The baseline answer time may be used to determine whether subsequently generated ringer profiles 409 are effective, or are increasing the likelihood of the user of the desk phone 405 not answering an incoming call.

Thus, in the manner described above, the system 400 dynamically ensures that the desk phone 405 is configured with a ringer profile 409 that minimizes the sound output by the desk phone 405 into its environment, while ensuring that incoming calls to the desk phone 405 are answered with no less frequency than they would be answered without the ringer profile 409. In an open office environment, where each desk includes a desk phone under the control of the ringer profile server 404, the aggregate effect may include a substantial decrease in workday interruptions, and an increase in employee productivity.

Figure 5:
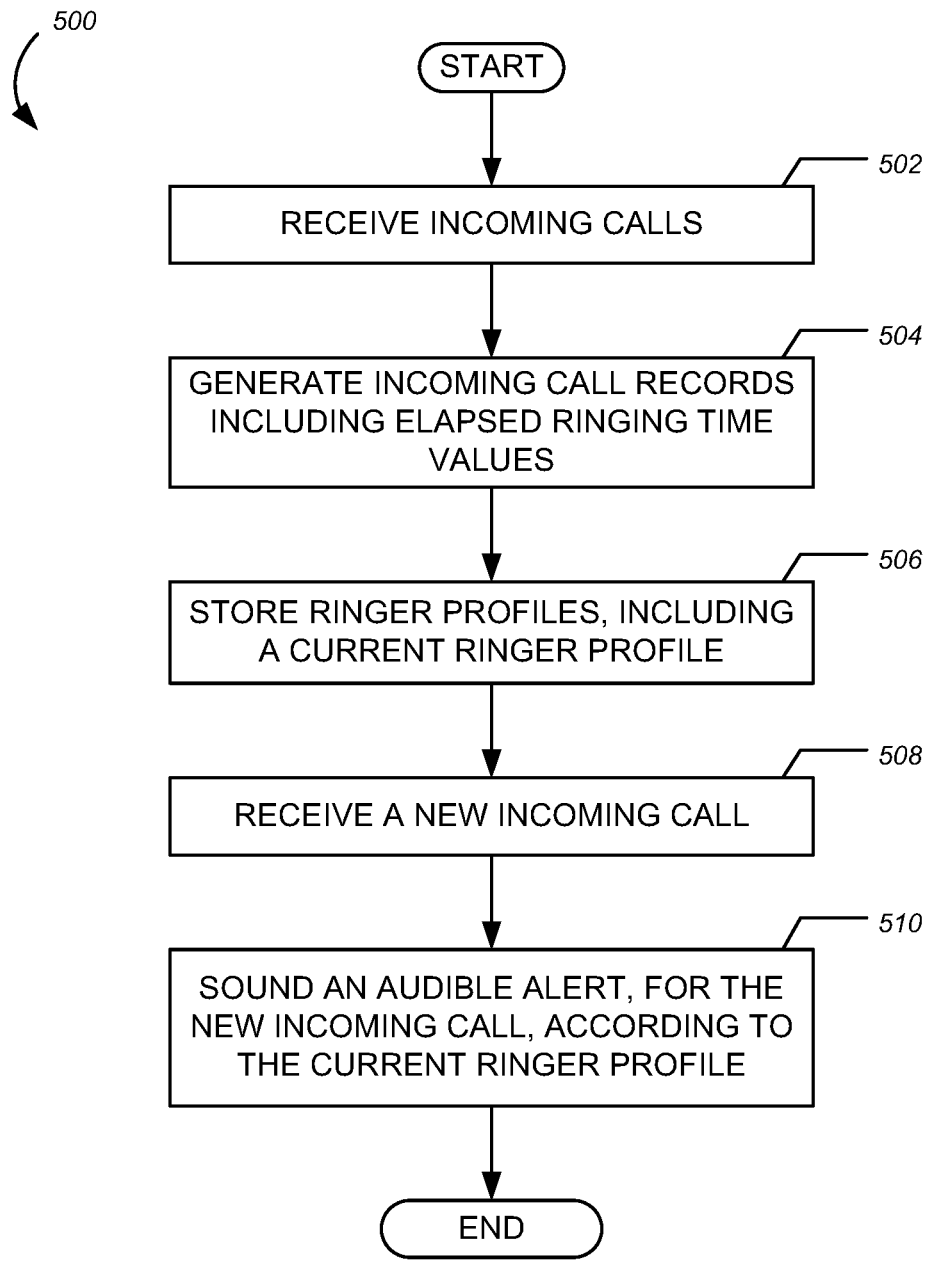
FIG. 5 is a flow diagram showing method for dynamic model-based ringer profiles, in accordance with one or more embodiments.

FIG. 5 shows a flowchart of a method 500 for dynamic model-based ringer profiles, in accordance with one or more embodiments of the invention. While the steps of the method 500 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 500 may be carried out by a desk phone, such as any of the desk phones 105, 205, 305, and 405, described above in reference to FIGS. 1, 2, 3A-3B, and 4, respectively.

At step 502, one or more incoming calls are received. The incoming calls may be received over any suitable network. Whenever an incoming call is received, a ringer may sound an audible alert to notify a user of the incoming call. For example, the ringer may play a ringtone. The ringer may sound the audible alert until the call is answered, the call goes to voicemail, or the ringer times out after a predetermined period of time (e.g., 10 seconds, 15 seconds, 20 seconds, etc.). Based on the one or more incoming calls, one or more incoming call records are generated at step 504. Each of the incoming call records may be associated with a different incoming call. For example, a first incoming call record is generated for a first incoming call, a second incoming call record is generated for a second incoming call, and a third incoming call record is generated for a third incoming call. Accordingly, each of the incoming call records may include one or more of the following values: a date the incoming call was received, a time the incoming call was received, an elapsed ringing time of the incoming call, whether the incoming call was answered, a volume of the ringer for the incoming call, a ringer profile that controlled the ringer for the incoming call, and whether a headset was connected to the desk phone or being worn when the incoming call was received.

In one or more embodiments, the desk phone performing the method 500 may store the incoming call records. The stored incoming call records may be partitioned between current data and historical data, depending on how a current time period is defined, as described above. Further, the desk phone performing the method 500 may build a ringer model using the incoming call records in the historical data, and generate one or more ringer profiles by applying the ringer model to current data. In such embodiments, the desk phone performing the method 500 may receive one or more of calendared event information, device location information, and information regarding an environment of the desk phone, any of which may be used as features when building the ringer model, or as input to the ringer model when generating a ringer profile.

In one or more embodiments, the desk phone performing the method 500 may send the incoming call records to a remote host, such as a ringer profile server. In such embodiments, the ringer profile server may store the incoming call records, build a ringer model, generate ringer profiles, and transmit those ringer profiles to the desk phone according to a method 600, described below in the context of FIG. 6.

Accordingly, ringer profiles, whether generated locally at a desk phone or received from a ringer profile server, are stored at step 506. The ringer profiles include a current ringer profile. The ringer profiles may be stored sequentially, such that a desk phone performing the method 500 only ever stores a single ringer profile. In other words, a first ringer profile is active and stored for a period of time (e.g., 1 hour, 2 hours, etc.), and then replaced by a second ringer profile that is active and stored for a subsequent period of time (e.g., 1 hour, 2 hours, etc.), which may be subsequently replaced by a third ringer profile that is active during a third period of time. Thus, each of the sequentially stored ringer profiles may be active for a limited period of time, before being replaced by a new ringer profile. As an option, several ringer profiles may be concurrently stored, such that a desk phone performing the method 500 may concurrently store two or more ringer profiles. In such embodiments, a first ringer profile may be active under a first condition for a period of time, and a second ringer profile may be active under a second condition for the period of time, either of which may be subsequently replaced, as described above. For example, the first ringer profile may be active when a headset is connected to the desk phone, and the second ringer profile may be active when the headset is disconnected from the desk phone. One or both of these ringer profiles may be replaced, for example, at the end of the hour, the day, or the week. The ringer profile that is active when a new incoming call is received at a desk phone is the current ringer profile. The current ringer profile includes a volume level instruction for each of one or more points in time within a duration for sounding an audible alert when an incoming call is received at the desk phone. For example, the current ringer profile may include a first instruction to sound a ringer for a first ringing period at a first ringer volume level, and a second instruction to sound the ringer for a second ringing period at a second ringer volume level.

Also, at step 508, a new incoming call is received. The incoming call may include any incoming phone call initiated by a calling party. In one or more embodiments, the new incoming call may be received when a desk phone receives an incoming call signal or command. For example, the desk phone may receive an SIP INVITE message from a call control server. As another example, the new incoming call may be received when the desk phone detects a predetermined voltage on a line.

At step 510, an audible alert is sounded in response to receiving the new incoming call. The audible alert is sounded according to the current ringer profile. The audible alert may be output by a ringer of the desk phone. Sounding the audible alert according to the current ringer profile includes any operation that outputs the audible alert in conformance with the volume level instructions of the current ringer profile. As an option, sounding the audible alert may include playing a stored ringtone. Thus, sounding the audible alert according to the current ringer profile may include playing a ringtone for a first ringing period at a first ringer volume level, and then playing the ringtone for a second ringing period at a second ringer volume level.

Figure 6:
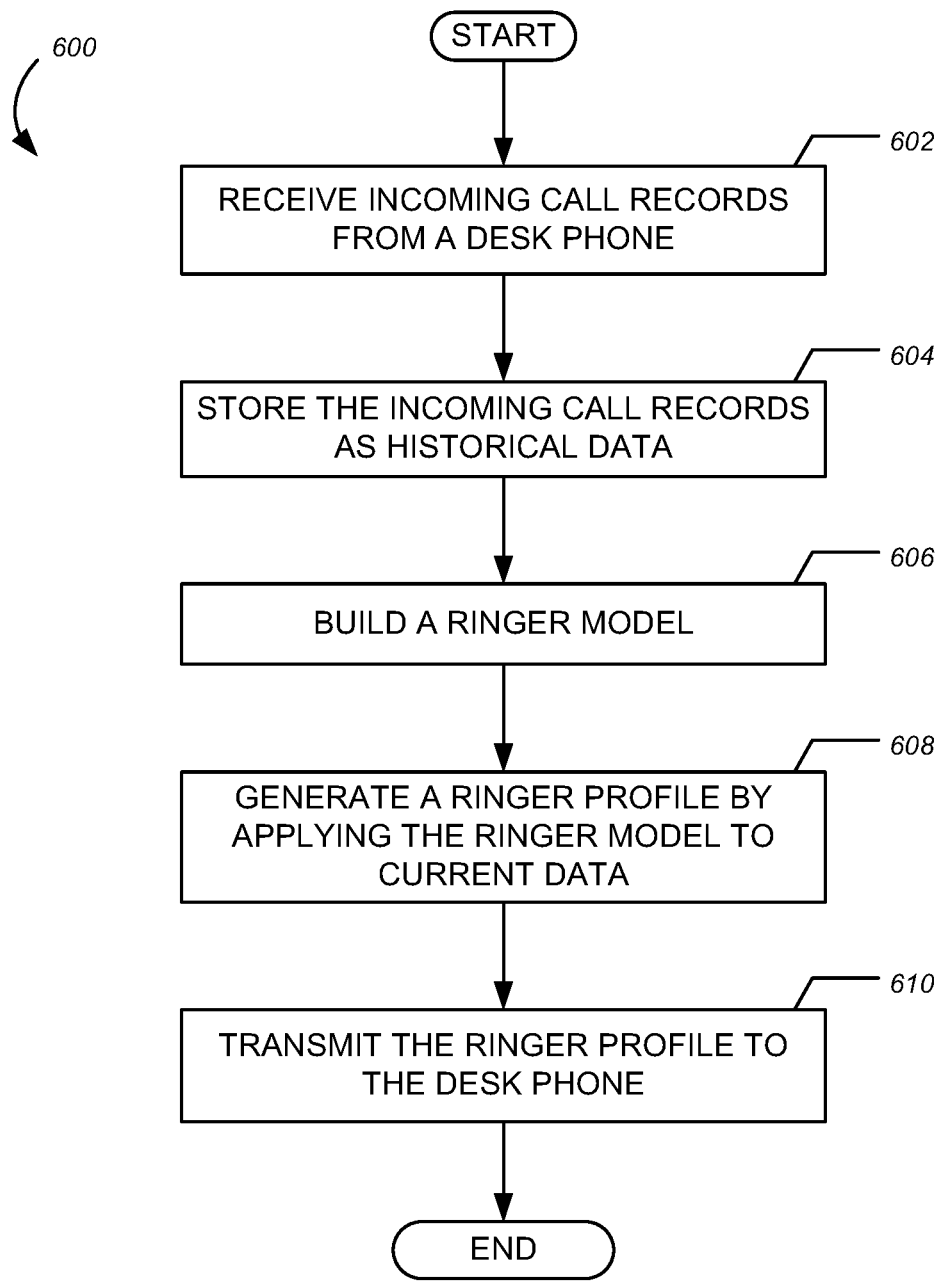
FIG. 6 is a flow diagram showing method for dynamic model-based ringer profiles, in accordance with one or more embodiments.

FIG. 6 shows a flowchart of a method 600 for dynamic model-based ringer profiles, in accordance with one or more embodiments of the invention. While the steps of the method 600 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 600 may be carried out by a ringer profile server, such as any of the ringer profile servers 204, 304, and 404, described above in reference to FIGS. 2, 3A-3B, and 4, respectively.

At step 602, incoming call records are received from a desk phone. Each of the incoming call records may be associated with a different phone call received at the desk phone. Each of the incoming call records may include one or more of the following values: a date the incoming call was received, a time the incoming call was received, an elapsed ringing time of the incoming call, whether the incoming call was answered, a volume of the ringer for the incoming call, a ringer profile that controlled the ringer for the incoming call, and whether a headset was connected to the desk phone or being worn when the incoming call was received.

Also, at step 604, the received incoming call records are stored as historical data. The historical data may also include calendared event information, device location information, and information regarding an environment of the desk phone from which the incoming call records were received at step 602. At step 606, a ringer model is built. The ringer model may be built by a learning algorithm that trains the ringer model using the historical data.

Further, a ringer profile is generated, at step 608, by applying the ringer model to current data. The current data may include one or more of incoming call records, location information, calendared event information, and environmental information for a current time period. For example, if the current time period encompasses the prior one-hour period, and the ringer profile is generated at LOAM, then the current data may include any of incoming call records of the desk phone, location information of a user of the desk phone, events on the user's calendar, and environmental information relevant to the time period between 9 AM and LOAM. Moreover, in such an example, the ringer model may be periodically re-applied to current data, such that a new ringer model is generated once an hour.

At step 610, the ringer profile is transmitted to the desk phone from which the incoming call records were received at step 602. As described above, in reference to the method 500, the ringer profile may then be used by the desk phone to control how the desk phone's ringer alerts its user to incoming calls.

Figure 7:
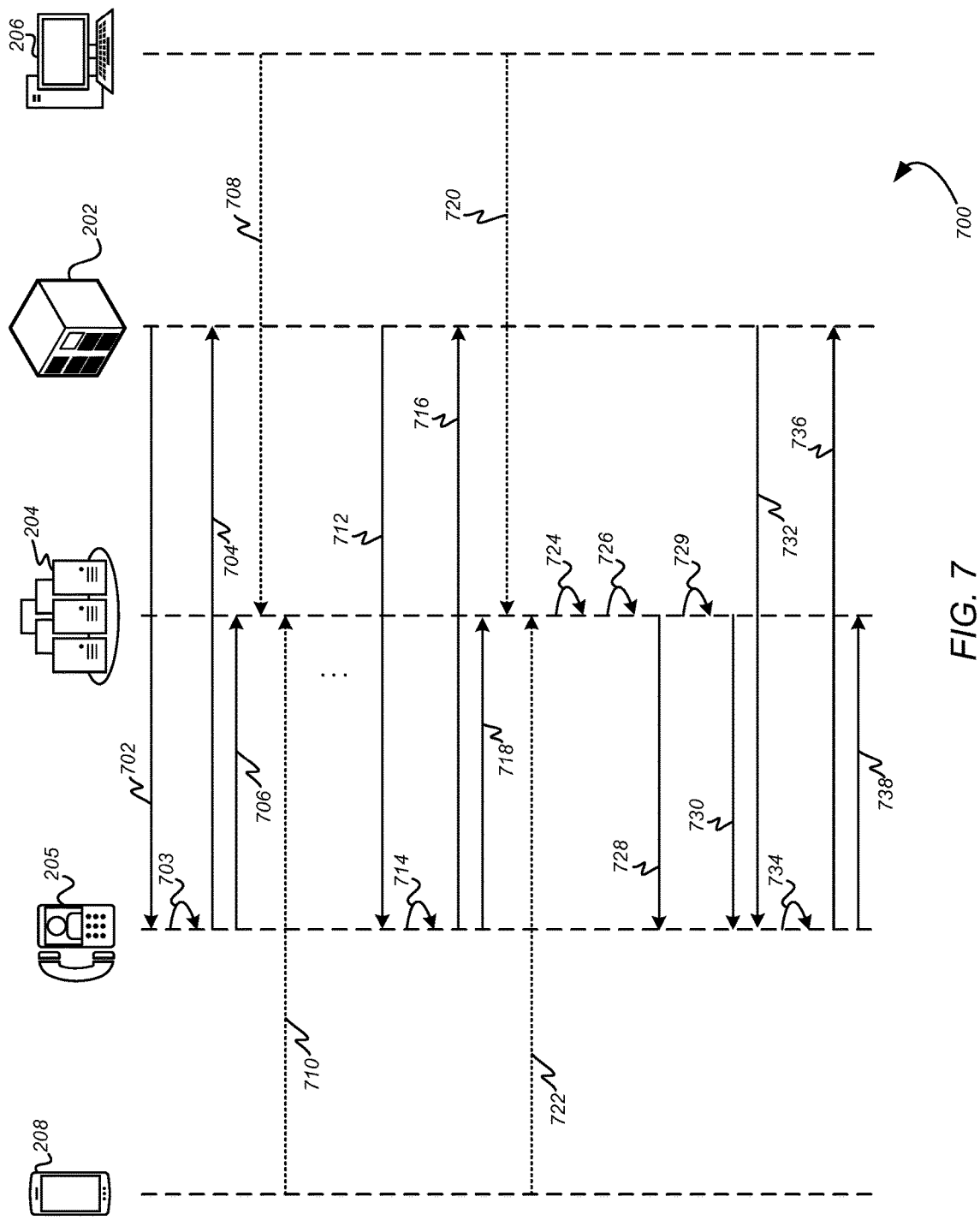
FIG. 7 shows an example of a communication flow for dynamic model-based ringer profiles, in accordance with one or more embodiments.

Referring to FIG. 7, a communication flow 700 for dynamic model-based ringer profiles is shown in accordance with one or more embodiments of the invention. As depicted in FIG. 7, the communication flow 700 proceeds between a mobile device 208, a ringer profile server 204, a desk phone 205, a call control server 202, and an environmental status server 206, each of which have been described above in reference to FIG. 2.

At operation 702, the call control server 202 notifies the desk phone 205 of an incoming call. For example, the call control server 202 may send the desk phone 205 a ring signal or command. Accordingly, at operation 703, the desk phone 205 rings to alert its user to the incoming call (e.g., a ringer plays a ringtone, etc.), and records the time it takes for the incoming call to be answered. At operation 704, the desk phone 205 accepts the incoming call via the call control server 202 (e.g., a SIP OK answer message, etc.), and a phone call proceeds between a user at the desk phone 205 and a far-end caller according to known systems and methods. Also, at operation 706, the desk phone 205 sends an incoming call record to the ringer profile server 204. The incoming call record may include a date and time of the incoming call, and a value indicating how long it took for the incoming call to be answered. The ringer profile server 204 may also receive, at operation 708, environmental information from the environmental status server 206, and device location information, at operation 710, from the mobile device 208 for a time substantially contemporaneous with the receipt of the incoming call at operation 702. For example, the device location information may include a location of the mobile device 208 at a time between 0 and 5 minutes of when the incoming call was received. Similarly, the environmental information may include an ambient volume of the environment of the desk phone 205 at the time between 0 and 5 minutes of when the incoming call was received.

The operations 702-710 described above may repeat for a period of days, weeks, or months, to accumulate enough incoming call records for building a ringer model for the desk phone 205. Accordingly, at operation 712, the call control server 202 notifies the desk phone 205 of another incoming call, and, at operation 714, the desk phone 205 rings to alert its user to the other incoming call, and records the time it takes for the other incoming call to be answered. Also, at operation 716, the desk phone 205 accepts the other incoming call via the call control server 202 and another phone call proceeds between a user at the desk phone 205 and a far-end caller. Also, at operation 718, the desk phone 205 sends another incoming call record to the ringer profile server 204. The ringer profile server 204 may also receive, at operation 720, environmental information from the environmental status server 206 for a time substantially contemporaneous with the receipt of the other incoming call at operation 712. The ringer profile server 204 may also receive, at operation 722, device location information from the mobile device 208 for a time substantially contemporaneous with the receipt of the other incoming call at operation 712. In this way, the ringer profile server 204 may accumulate a substantial number of incoming call records from the desk phone 205. Moreover, the incoming call records may be correlated with other information that pertains to the environment of the desk phone 205 and/or the user of the desk phone 205. These incoming call records and other information may be stored as historical data.

Thus, at operation 724, the ringer profile server 204 builds a ringer model using the historical data. Also, at operation 726, the ringer profile server 204 applies the ringer model to data for a current time period (i.e., current data). The current data may include, for example, the current day and time. Also, the current data may include location information that was received from the mobile device 208 in the past 15 minutes, 30 minutes, or hour. Similarly, the current data may include any environmental ambient volume information for the environment of the desk phone 205 that was received in the past 15 minutes, 30 minutes, or hour. As a result of applying the ringer model to the current data at operation 726, a ringer profile is generated. The ringer profile is sent to the desk phone 205 at operation 728. The desk phone 205 may store the ringer profile such that it controls the ringer of the desk phone 205 for any incoming calls received, for example, in the next hour. However, no calls may be received, and the ringer profile received at operation 728 may go unused.

Upon or before the expiration of the ringer profile sent at operation 728, the ringer profile server 204 again applies the ringer model to data for a current time period and generates, at operation 729, a new ringer profile. The ringer model may have been updated since operation 726. Also, the current data may have changed since operation 726. For example, in addition to being an hour later in the work day, the ambient volume of the environment of the desk phone 205 may have changed. Also, the mobile device 208 may now be reporting a different location. The new ringer profile is sent to the desk phone 205 at operation 730. The desk phone 205 may store the new ringer profile such that it controls the ringer of the desk phone 205 for any incoming calls that are subsequently received. The new ringer profile may include an instruction that defines the new ringer profile as applicable for the next hour, next 2 hours, or the next day.

At operation 732, the call control server 202 notifies the desk phone 205 of yet another incoming call. At operation 734, the desk phone 205 alerts its user to the incoming call by sounding an audible alert in accordance with the ringer profile received at operation 730. In other words, the duration and volume of the ringer of the desk phone 205 may be controlled according to instructions in the ringer profile in a manner that limits the volume and duration with which the desk phone 205 rings. Also, at operation 734, the desk phone 205 records the time it takes for the incoming call to be answered. At operation 736, the desk phone 205 accepts the incoming call via the call control server 202, and a phone call proceeds between a user at the desk phone 205 and a far-end caller. Also, at operation 738, the desk phone 205 sends an incoming call record to the ringer profile server 204. The incoming call record may include a date and time of the incoming call, a value indicating how long it took for the incoming call to be answered, and a value indicating which ringer profile was active at the desk phone 205 when the incoming call was received. In this way, the ringer profile server 204 may continually update its ringer model for the desk phone 205. As a result, the ringer profile server 204 may over time reduce the volume and duration with which the desk phone 205 rings into its environment while monitoring call answer times to ensure that the user of the desk phone 205 is not negatively impacted by a reduction in volume and/or duration in ringer output.

In one or more embodiments, the desk phone 205 may store a ringer profile that is conditionally used for incoming calls from a specific caller. In other words, the desk phone 205 may store a ringer profile that is used only when an incoming call is received from one or more specific phone numbers or extensions. Such a phone number or extension may be associated with, for example, a manager, receptionist, or family member of the user of the desk phone 205. Accordingly, the desk phone 205 may ring in a unique manner according to the particular ringer profile when the user's manager calls the desk phone 205. As another example, the desk phone 205 may ring in a unique manner according the particular ringer profile when the incoming call is forwarded from the receptionist, whether forwarded manually by the receptionist or automatically because the receptionist was not at his or her phone when the incoming call was first received. The particular ringer profile may be downloaded to the desk phone 205 by the ringer profile server 204 for a single incoming call, or may be generally stored to the desk phone 205 for a period of hours, days, weeks, etc.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method for dynamic model-based ringer profiles, comprising:
   receiving one or more incoming calls;
   based on the one or more incoming calls, generating one or more incoming call records, each of the incoming call records including an elapsed ringing time value associated with one of the incoming calls;
   sending the one or more incoming call records to a remote ringer profile server;
   receiving, from the remote ringer profile server, one or more ringer profiles, wherein the remote ringer profile server builds a ringer model using the one or more incoming call records, and generates the one or more ringer profiles using the ringer model;
   storing the one or more ringer profiles including a current ringer profile, wherein the one or more ringer profiles are generated using the one or more incoming call records;
   receiving a new incoming call;
   in response to receiving the new incoming call, sounding a ringtone according to the current ringer profile.

2. The method of claim 1, wherein each of the one or more incoming call records includes a ringer volume value.

3. The method of claim 1, wherein each of the one or more incoming call records includes a call answered value.

4. A method for dynamic model-based ringer profiles, comprising:
   receiving one or more incoming calls;
   based on the one or more incoming calls, generating one or more incoming call records, each of the incoming call records including:
     an elapsed ringing time value associated with one of the incoming calls, and
     a headset connected value;
   storing one or more ringer profiles including a current ringer profile, wherein the one or more ringer profiles are generated using the one or more incoming call records;
   receiving a new incoming call; and
   in response to receiving the new incoming call, sounding a ringtone according to the current ringer profile.

5. The method of claim 1, wherein each of the one or more incoming call records includes an active ringer profile value.

6. The method of claim 1, wherein the current ringer profile includes:
   a first instruction to sound the ringtone for a first ringing period at a first ringer volume level, and
   a second instruction to sound the ringtone for a second ringing period at a second ringer volume level.

7. The method of claim 1, wherein the current ringer profile is active for a predetermined time period of between 30 minutes and 12 hours.

8. A desk phone, comprising:
   a communications interface;
   a ringer;
   a timer;
   at least one processor; and
   memory coupled to the at least one processor, the memory having stored therein instructions which when executed by the at least one processor, cause the at least one processor to perform a process for dynamic model-based ringer profiles, the process including:
     receiving one or more incoming calls;
     for each of the one or more incoming calls: calculating an elapsed ringing time value of the incoming call using the timer, and generating an incoming call record including the elapsed ringing time value of the incoming call;
     sending the one or more incoming call records to a remote ringer profile server;
     receiving, from the remote ringer profile server, a current ringer profile;
     storing the current ringer profile;
     receiving a new incoming call; and in response to receiving the new incoming call, sounding the ringer according to the current ringer profile.

9. The desk phone of claim 8, wherein each of the one or more incoming call records includes a call answered value.

10. The desk phone of claim 8, wherein each of the one or more incoming call records includes a ringer volume value.

11. The desk phone of claim 8, wherein each of the one or more incoming call records includes a headset connected value.

12. The desk phone of claim 8, wherein each of the one or more incoming call records includes an active ringer profile value.

13. The desk phone of claim 8, wherein the current ringer profile includes:
 a first instruction to sound the ringer for a first ringing period at a first ringer volume level, and
 a second instruction to sound the ringer for a second ringing period at a second ringer volume level.

14. A system, comprising:
 at least one processor; and
 memory coupled to the at least one processor, the memory having stored therein instructions which when executed by the at least one processor, cause the at least one processor to perform a process for generating dynamic model-based ringer profiles, the process including:
  receiving, from a desk phone, one or more incoming call records, wherein each of the incoming call records includes an elapsed ringing time value;
  storing the one or more incoming call records as historical data;
  building a ringer model by applying a model builder to the historical data;
  generating a ringer profile by applying the ringer model to current data; and
  transmitting the ringer profile to the desk phone.

15. The system of claim 14, wherein each of the one or more incoming call records includes a call answered value.

16. The system of claim 14, wherein the current data includes a location of a user of the desk phone.

17. The system of claim 14, wherein the current data includes a current day and a current time.

18. The system of claim 14, wherein the current data includes information regarding an environment of the desk phone.

\* \* \* \* \*